Patented June 6, 1933

1,912,747

UNITED STATES PATENT OFFICE

JAMES C. WHITE AND HERBERT G. STONE, OF KINGSPORT, TENNESSEE, ASSIGNORS TO EASTMAN KODAK COMPANY, OF ROCHESTER, NEW YORK, A CORPORATION OF NEW YORK

PROCESS OF MANUFACTURING ACETIC ANHYDRIDE FROM CRUDE SODIUM ACETATE

No Drawing.    Application filed March 4, 1930. Serial No. 433,173.

This invention relates to a process for the manufacture of acetic anhydride, and relates more particularly to the manufacture of acetic anhydride from alkali salts of acetic acid.

Acetic anhydride is prepared, in some instances, by the action of an acid chloride upon the alkali salt of acetic acid. Another process consists in reacting upon an alkali acetate such as sodium acetate with a compound of sulfur and chlorine, together with a catalyst; this reaction is conducted in a solution containing acetic anhydride. As a modification of the latter process, the sodium acetate or other alkali acetate is mixed with dry sulfur and a catalyst, together with sufficient acetic anhydride as a solvent, and chlorine bubbled through the mass.

As would be expected, the degree of purity obtained in any of the above processes is determined largely by the purity of the ingredients used in preparing the anhydride. To be sure, there are many processes in which acetic anhydride of the technical grade, that is, containing a considerable percentage of impurities, may be employed, but in the manufacture of the esters of cellulose, and especially cellulose acetate, it has been found that even the purest commercial anhydrides obtainable are not always suitable for the preparation of cellulose acetate of the best quality. While cellulose acetate prepared from the more or less impure acetic anhydride may in some instances be used for the manufacture of artificial silk and like products, such cellulose acetate frequently cannot be successfully employed in the photographic art in which an acetate of the highest quality is necessary.

It has, therefore, been generally necessary heretofore in the preparation of acetic anhydride which would be suitable for the production of cellulose esters of sufficiently good quality for photographic purposes to employ substantially pure starting materials which, of course, made the cost of the acetic anhydride quite high; even the redistillation of the acetic anhydride did not always improve it sufficiently to make it always useful for photographic requirements.

An object of the present invention is to provide a process for the manufacture of acetic anhydride from alkali acetate containing a considerable percentage of impurities. Another object of the present invention is to provide a process for the manufacture of acetic anhydride from sodium acetate containing charred empyreumatic impurities. Other objects will hereinafter appear.

We have made the surprising discovery that acetic anhydride of good quality and sufficient purity for the production of cellulose acetate which is useful for photographic purposes can be produced upon a commercial scale from crude sodium acetate, such as that which has been prepared in accordance with the copending application of Herbert G. Stone, Serial No. 290,053.

The process of preparing sodium acetate as described by Stone consists first in the neutralization, with sodium carbonate or caustic soda, of pyroligneous acid liquor or similar solutions containing empyreumatic impurities. The solution of sodium acetate obtained by this neutralization is then concentrated until the sodium acetate is substantially dry. A black, tarry mass is obtained which is heated in a closed chamber at elevated temperatures of approximately 200° to 300° C., or thereabouts until the tarry matter is completely charred or carbonized without substantial injury to the sodium acetate contained in the crude mixture.

The sodium acetate obtained by this process has a dark gray color and contains much charred or carbonaceous material as impurities which in some instances will run as high as 6 per cent or more. It is this crude sodium acetate which we have found can, upon a commercial scale, be converted by a single reaction and by distillation into acetic anhydride of good purity. Although the assumption had been current prior to our invention that this crude sodium acetate must be recrystallized, possibly a number of times, before the sodium acetate could be utilized in most processes and particularly in the production of acetic anhydride, we have discovered that this crude impure sodium acetate may be utilized directly in the production of acetic anhydride which is very suitable for the preparation of cellulose acetate of the most rigid specification as to purity, etc., and this in spite of the fact that the appearance alone of this crude sodium acetate would seem to dictate that it must first be purified.

While we do not wish to be limited by any theory of our invention, it may be stated that one of the factors recognized by us with respect to this crude sodium acetate containing charred empyreumatic impurities is that the sulfur dichloride reacts only with the sodium acetate and not with the finely divided unreactive carbonaceous impurities, the latter merely settling out during the reaction as inert residue away from which the acetic anhydride is finally distilled in a form of very desirable purity. It is also reasonable to believe that the finely divided carbon present absorbs certain impurities which would otherwise distill over with and contaminate the acetic anhydride.

Our invention, therefore, briefly comprises adding to crude sodium acetate, such as that above described, approximately one-half to twice its weight of acetic anhydride and then with thorough agitation adding sulfur dichloride or equivalent in an amount equal to approximately one-half the weight of the crude sodium acetate, the reaction temperature being maintained in the neighborhood of 20° to 40° C., and preferably not above 50° C., until the reaction is completed, after which the acetic anhydride which has been produced (together with that originally added) is separated from the reaction mass, preferably by distillation under vacuum. This may be termed our crude acetic anhydride, for purposes of identification, although it will be understood that it is a high grade crude and in fact contains no more impurities than the crude acetic anhydride produced from pure sodium acetate. While the reaction may be facilitated slightly by the addition of certain catalysts we have not found their use of sufficient added value to warrant the additional expense of their use. The amount of acetic anhydride which is originally added to the crude sodium acetate is determined, to a great extent at least, by the type of mixing device employed for the reaction,—i. e., since the acetic anhydride is added as a diluent, the more intimate the mixing of the reaction constituents, the less diluent will be required; this is, however, offset or counterbalanced by the fact that, within reasonable limits, the more acetic anhydride that is added the better will be the control of the chemical reaction. The crude acetic anhydride produced by the first distillation may next be given a chemical treatment to free it of any free sulphur or chlorine compounds after which it may be redistilled, preferably under vacuum, to give final pure acetic anhydride. The foregoing will be further amplified hereinafter.

We shall now give a detailed description of methods for preparing acetic anhydride by the use of crude sodium acetate, such as that described, but it will be understood we shall not be limited by the details or proportions of ingredients given except as they be included in the appended claims. 100 parts of crude sodium acetate, such as that prepared by the Stone process hereinbefore referred to, are thoroughly mixed with approximately 50 to 200 parts of acetic anhydride in a suitable reaction vessel exposed to atmospheric pressure and preferably jacketed so that a cooling medium may be employed to control the temperature of the reaction. We have found that a ball mill may be employed with certain advantages, such as intimate mixing, with the result that less acetic anhydride diluent will be necessary; by conducting the reaction in a ball mill, as little as 50 parts of acetic anhydride diluent for each 100 parts of crude sodium acetate may be employed with success.

If a jacketed vessel equipped with a stirrer is employed, it has been found desirable to increase the amount of acetic anhydride diluent to approximately 200 parts thereof for each 100 parts of crude sodium acetate; while more anhydride is involved with this type of mixing, the temperature of the reaction may be better controlled due to the increased reaction mass present. 50 parts of sulfur dichloride may next be added slowly with constant stirring to the 100 parts of crude sodium acetate, the entire mass being maintained at a temperature of approximately 20 degrees C., or thereabouts and preferably below 40° C. When the heat of the reaction subsides, which it does in a matter of approximately four to six hours, the reaction has gone to completion. The acetic anhydride formed is separated from the other products of the reaction and the residue by distilling the mixture under a vacuum, in any well known apparatus for that purpose, at a temperature of approximately 50 to 75° C.

If it be desired to employ a catalyst, one part of either antimony powder, pinene hydrochloride or anhydrous ferric sulfate, or a mixture of the latter two, may be employed with 100 parts of the crude sodium acetate in the above reaction.

We have also found that certain additional advantages may be obtained if the crude sodium acetate be slowly added to the reaction constituents in place of adding the reaction constituents to the sodium acetate. For instance, we may make a mixture of 200 parts (or less, depending upon the degree of agitation employed) of acetic anhydride and 50 parts of sulfur dichloride. These constituents are thoroughly mixed together and to this is gradually added 100 pounds of sodium acetate. The addition of the sodium acetate is conducted with a thorough stirring of the whole mass. The best yield is obtained by maintaining the temperature of the reaction at approximately 20° C. The reaction mass is then distilled as before described.

While we have referred above to sulfur dichloride for reacting upon the crude sodium acetate, we are by no means confined solely to its use in carrying out the reaction. For instance, we may employ instead of sulfur dichloride, other acid chlorides such as phosphorous oxy-chloride, acetyl chloride, sulfuryl chloride or carbonyl chloride; the conditions under which these compounds may be employed in the reaction are approximately the same as to quantities, temperature, time, etc., as in the case of sulfur dichloride although it may be stated that in the case of phosphorous oxy-chloride the temperature of the reaction may be permitted to go a little higher, possibly, than when employing the other compounds. Other acid chlorides or similar compounds equivalent to the above will doubtless occur to those skilled in the art and are to be included within the scope of this invention.

We have referred to the acetic anhydride resulting from the reaction and first distillation as a crude product. While the anhydride so produced is a valuable product of commerce having important uses and is just as pure a grade of acetic anhydride as is produced by the heretofore usual method of reacting upon pure sodium acetate, i. e., the crude anhydride is free from any carbonaceous impurities, it contains—like any other crude acetic anhydride—small quantities of free sulphur (where a sulfur containing compound has been used in the main reaction) and possibly some acetyl chloride which must be eliminated if the anhydride is to be used for the making of photographic film, for instance. We have found that pure acetic anhydride can be produced from the above high grade crude anhydride produced by our invention by subjecting it to chemical treatment for a brief period and then redistilling it, preferably under a vacuum. While our chemical treatment methods may be novel per se, it will be understood that others may be known to or devised by those skilled in the art and our process for producing the high grade crude anhydride is not to be limited to any particular after-treatment except where so indicated in the claims appended hereto.

As an example of a method for finally purifying the high grade crude anhydride produced by our process, 10,000 pounds of the crude anhydride may be charged into a jacketed still equipped with a stirring mechanism; to this anhydride is added through a well pipe about 25 pounds of chlorine gas at a temperature not exceeding approximately 25° C. After the addition of the chlorine, there is added to the mixture approximately 100 pounds of pure anhydrous sodium acetate and agitation continued for about 15 minutes without the addition of heat. The whole mass is then heated to boiling and the anhydride refluxed for 4 hours after which it is distilled, preferably under vacuum, and collected in suitable receivers.

This method of refinement is particularly adapted to anhydride produced by a reaction involving sulfur dichloride. The anhydride so produced is of high purity and emminently suited for such critical processes as the production of cellulose acetate for photographic purposes.

As an alternative, 10,000 pounds of our crude anhydride may be charged into a similar still to which may be added approximately 150 pounds of pure anhydrous sodium acetate and the temperature raised to boiling, after which the anhydride is refluxed for about 4 hours. It is then distilled under vacuum, the distillate being conducted to a second still wherein there is added in successive stages at 15 minute intervals, about 10 pounds of potassium permanganate, 20 pounds of sulfuric acid and 40 to 50 pounds of sodium acetate, after which the mass is brought to a boil and the anhydride refluxed for a few minutes, following which the anhydride is distilled off under vacuum and collected in suitable receivers as pure anhydride.

We have also found that some advantage may be obtained by passing the acetic anhydride vapors over sodium nitrate during the distillation of the anhydride in that slightly higher purity of acetic anhydride results. The sodium nitrate is merely placed in a horizontal cylinder or similar container and the anhydride vapors passed thereover following which the vapors are condensed in the same manner as would be done were the sodium nitrate not employed.

The advantages that are derived from the preparation of high grade crude acetic anhydride as well as pure acetic anhydride by the use of our process not only reside in the saving from not having to recrystallize or otherwise purify the sodium acetate, but the charred carbon or carbonaceous impurities in the crude sodium acetate, as before related, seems to have a tendency to absorb many of the volatile impurities which would otherwise pass over with the distillation of the acetic anhydride and thereby contaminate it.

From a consideration of the above disclosure it is apparent that the above processes may be employed to advantage in preparing acetic anhydride and the proportions of the various ingredients may vary within well defined limits, providing the sodium acetate employed has been prepared as described hereinabove, without in any way departing from this invention or sacrificing any of the advantages that may be derived from its use.

What we claim as new and desire to be secured by Letters Patent of the United States is:

1. The process of producing acetic anhydride which comprises treating crude sodium acetate containing carbonaceous impurities with a bath containing sulfur dichloride.

2. The process of producing acetic anhydride which comprises treating crude sodium acetate containing carbonaceous impurities with a bath containing sulfur dichloride and acetic anhydride.

3. The process of producing acetic anhydride which comprises treating crude sodium acetate containing carbonaceous impurities with a bath containing sulfur dichloride and acetic anhydride, and separating the acetic anhydride present at the completion of the reaction by distillation.

4. Process of producing acetic anhydride which comprises treating crude sodium acetate containing carbonaceous impurities with a bath containing an acid chloride which will react with the sodium acetate to form acetic anhydride.

5. Process of producing acetic anhydride which comprises treating crude sodium acetate containing carbonaceous impurities with a bath containing acetic anhydride and an acid chloride which will react with the sodium acetate to form acetic anhydride.

6. Process of producing acetic anhydride which comprises treating crude sodium acetate containing carbonaceous impurities with a bath containing an acid chloride which will react with the sodium acetate to form acetic anhydride, and separating the acetic anhydride so produced from the reaction mass.

7. The process of producing acetic anhydride which comprises treating 100 parts of crude sodium acetate containing charred empyreumatic impurities with approximately 50 to 200 parts of acetic anhydride and separating the resulting acetic anhydride from the reaction mass and approximately 50 parts of sulfur dichloride.

8. The process of producing acetic anhydride which comprises treating 100 parts of crude sodium acetate containing charred empyreumatic impurities with approximately 50 to 200 parts of acetic anhydride and approximately 50 parts of sulfur dichloride.

9. The process of producing acetic anhydride which comprises treating crude sodium acetate containing charred empyreumatic impurities with a bath containing sulfur dichloride and acetic anhydride at a temperature below approximately 35° C.

10. The process of producing acetic anhydride which comprises treating 100 parts of crude sodium acetate containing charred empyreumatic impurities with approximately 50 to 200 parts of acetic anhydride and approximately 50 parts of sulfur dichloride, at a temperature below approximately 35° C.

11. Process of producing acetic anhydride which comprises treating crude sodium acetate containing carbonaceous impurities with a bath containing sulfur dichloride, distilling acetic anhydride away from the reaction mass and condensing it, adding chlorine and anhydrous sodium acetate to the condensate, heating the latter reaction mass under reflux conditions and then distilling pure acetic anhydride away from the latter reaction mass.

12. The process of producing acetic anhydride which comprises making a mixture of acetic anhydride and sulfur dichloride and then adding slowly to that mixture, crude sodium acetate containing carbonaceous impurities.

13. The process of producing acetic anhydride which comprises making a mixture of acetic anhydride and sulfur dichloride, adding slowly to that mixture, crude sodium acetate containing carbonaceous impurities and distilling acetic anhydride from the reaction mass.

14. The process of producing acetic anhydride which comprises treating the product obtained by carbonizing a neutralized pyroligneous acid, with a bath containing an acid chloride which will react with the salt of the pyroligneous acid to form acetic anhydride.

15. The process of producing acetic anhydride which comprises treating the product obtained by carbonizing a neutralized pyroligneous acid with a bath containing acetic anhydride and an acid chloride which will react with the salt of the pyroligneous acid to form acetic anhydride.

16. The process of producing acetic anhydride which comprises treating sodium acetate and an absorbent carbonaceous material, with a bath containing an acid chloride which will react with the sodium acetate to form acetic anhydride.

17. The process of producing acetic anhydride which comprises treating crude sodium acetate containing carbonaceous impurities with a bath containing sulfuryl chloride.

18. The process of producing acetic anhydride which comprises treating crude sodium acetate containing carbonaceous impurities with a bath containing acetyl chloride.

Signed at Kingsport, Tennessee, this 27th day of February, 1930.

JAMES C. WHITE.
HERBERT G. STONE.